Dec. 17, 1968   R. C. STEELE   3,416,983
METHOD AND APPARATUS FOR MAKING HONEYCOMB
Filed March 16, 1964   6 Sheets-Sheet 1
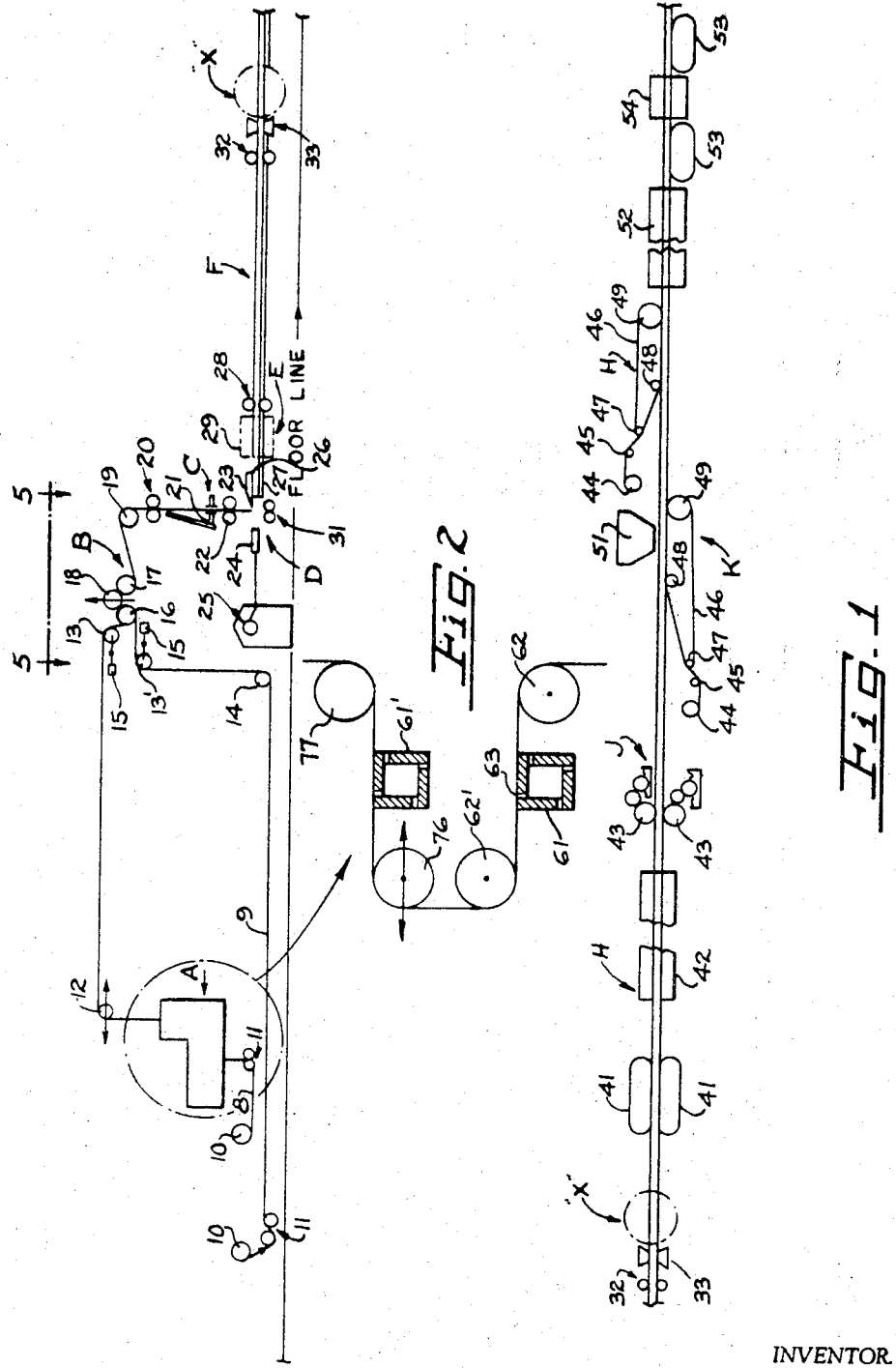
INVENTOR.
ROGER C. STEELE
BY
ATTORNEYS

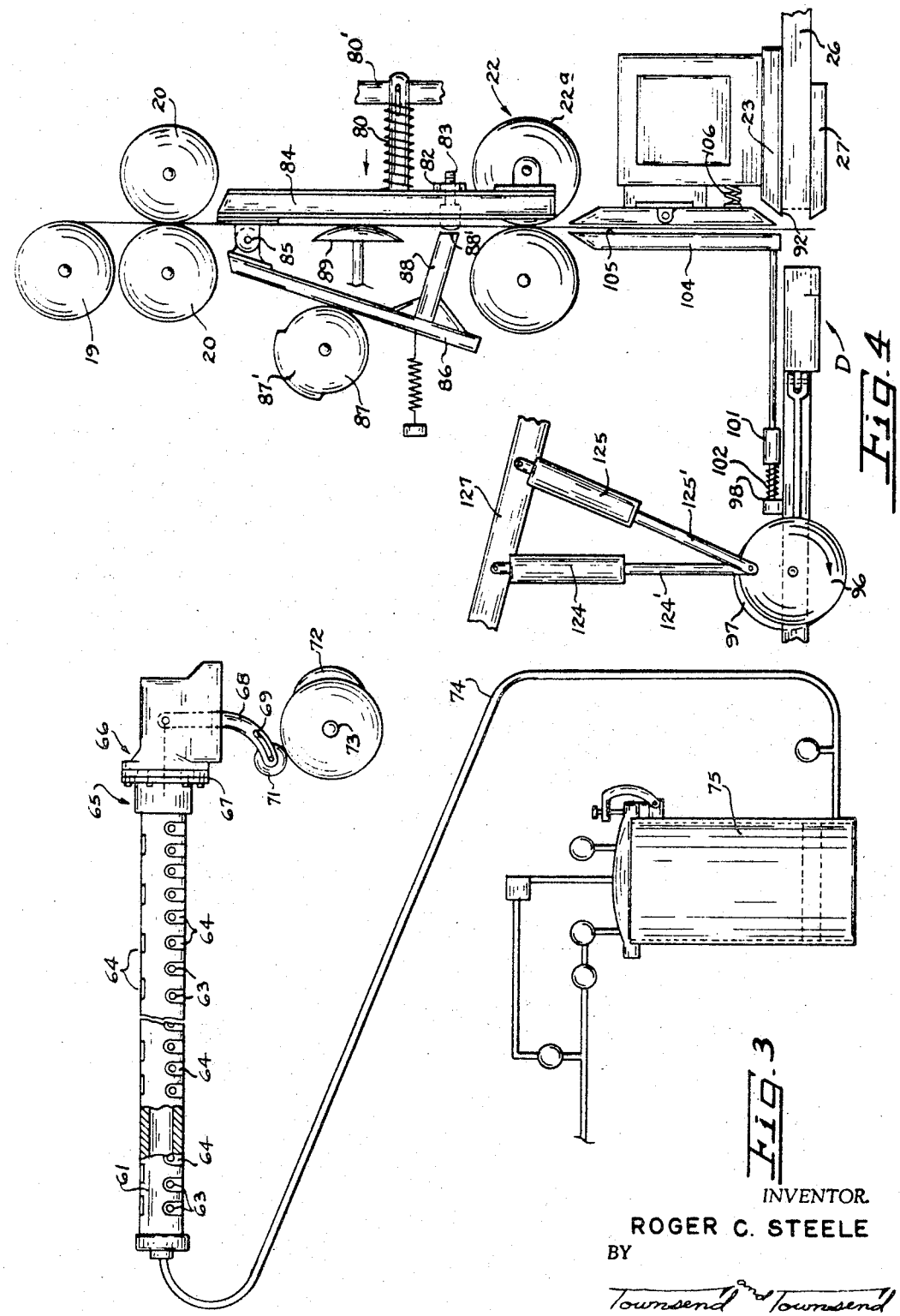

Dec. 17, 1968     R. C. STEELE     3,416,983
METHOD AND APPARATUS FOR MAKING HONEYCOMB
Filed March 16, 1964     6 Sheets-Sheet 3
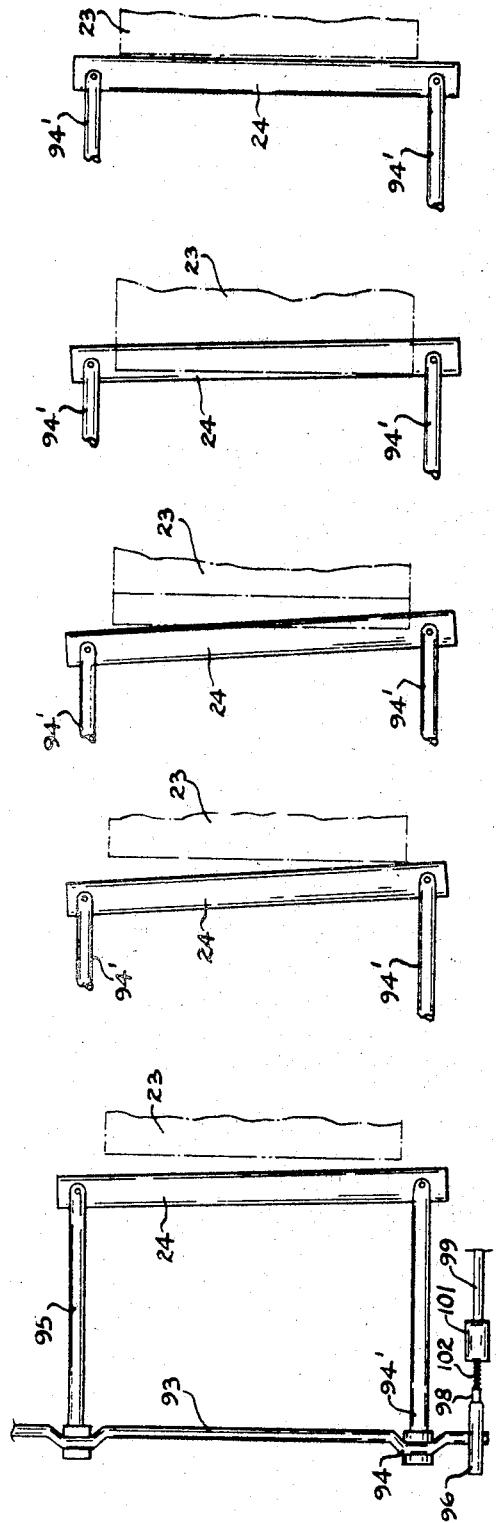
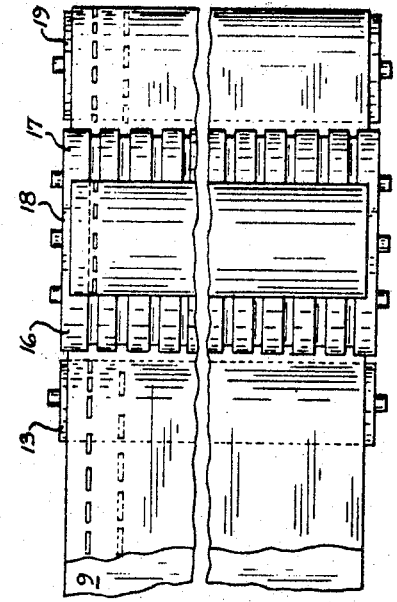
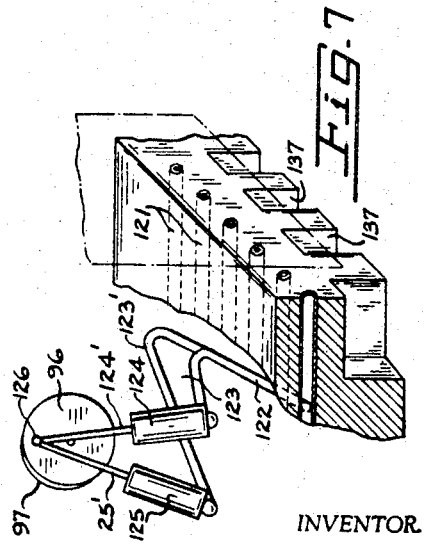
INVENTOR.
ROGER C. STEELE
BY Townsend and Townsend
ATTORNEYS

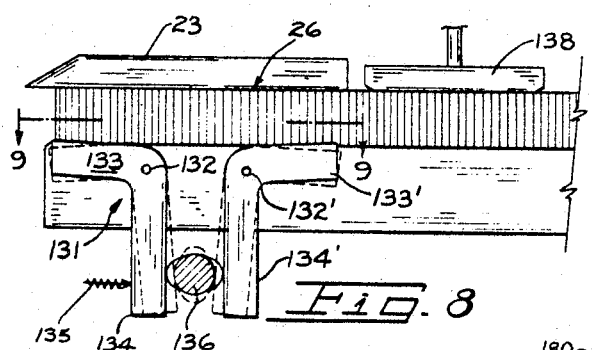
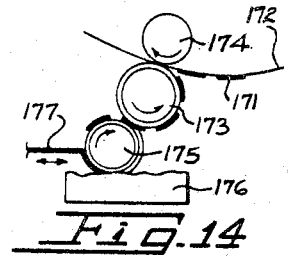
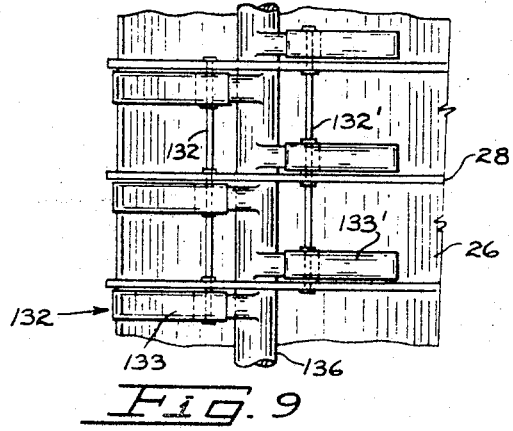
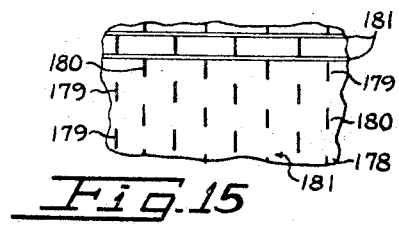
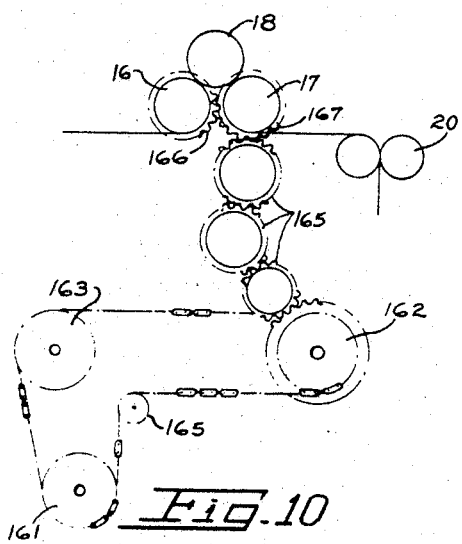
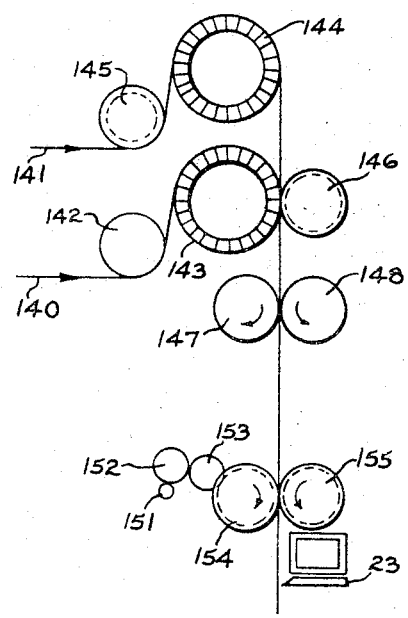

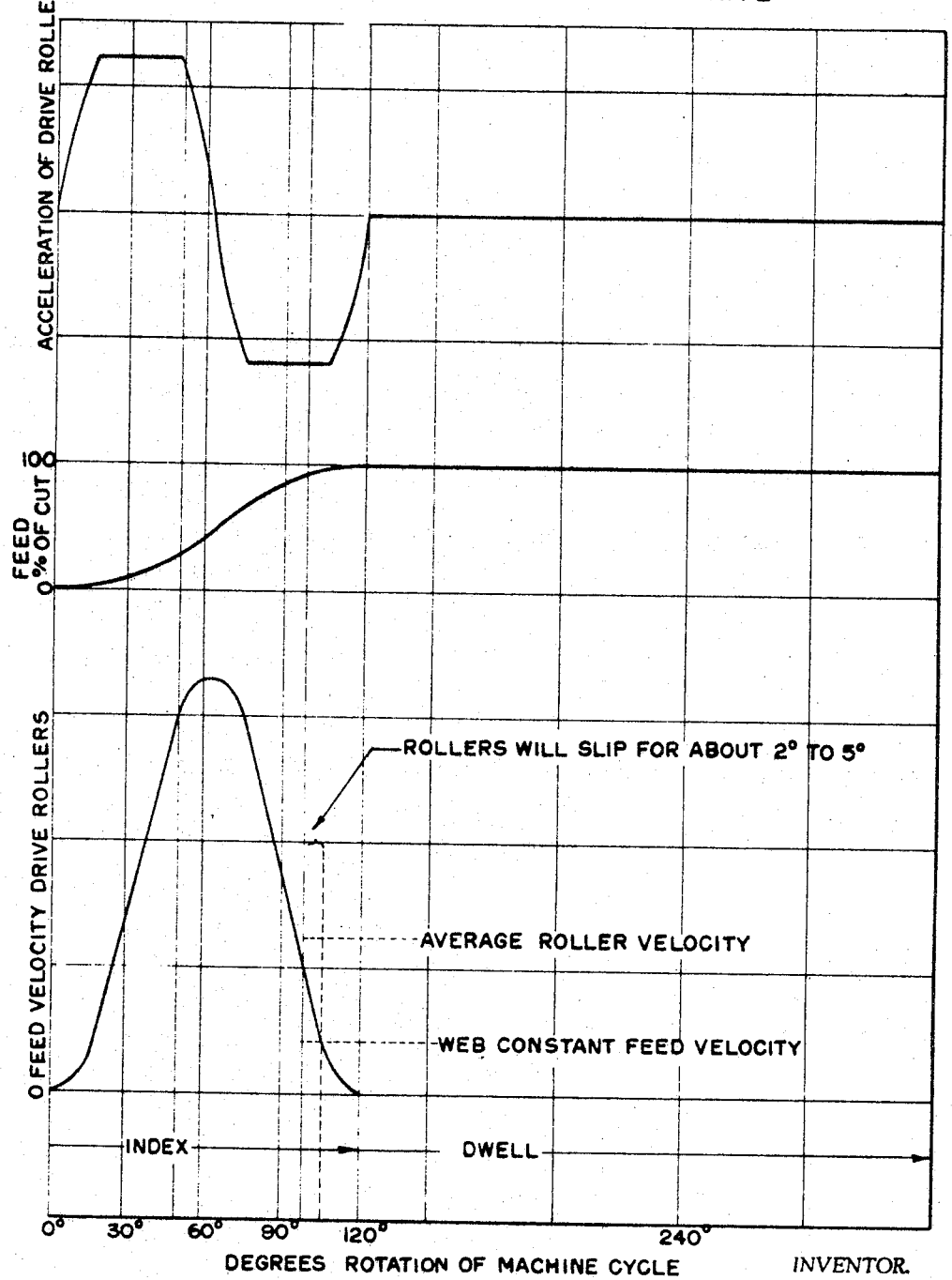

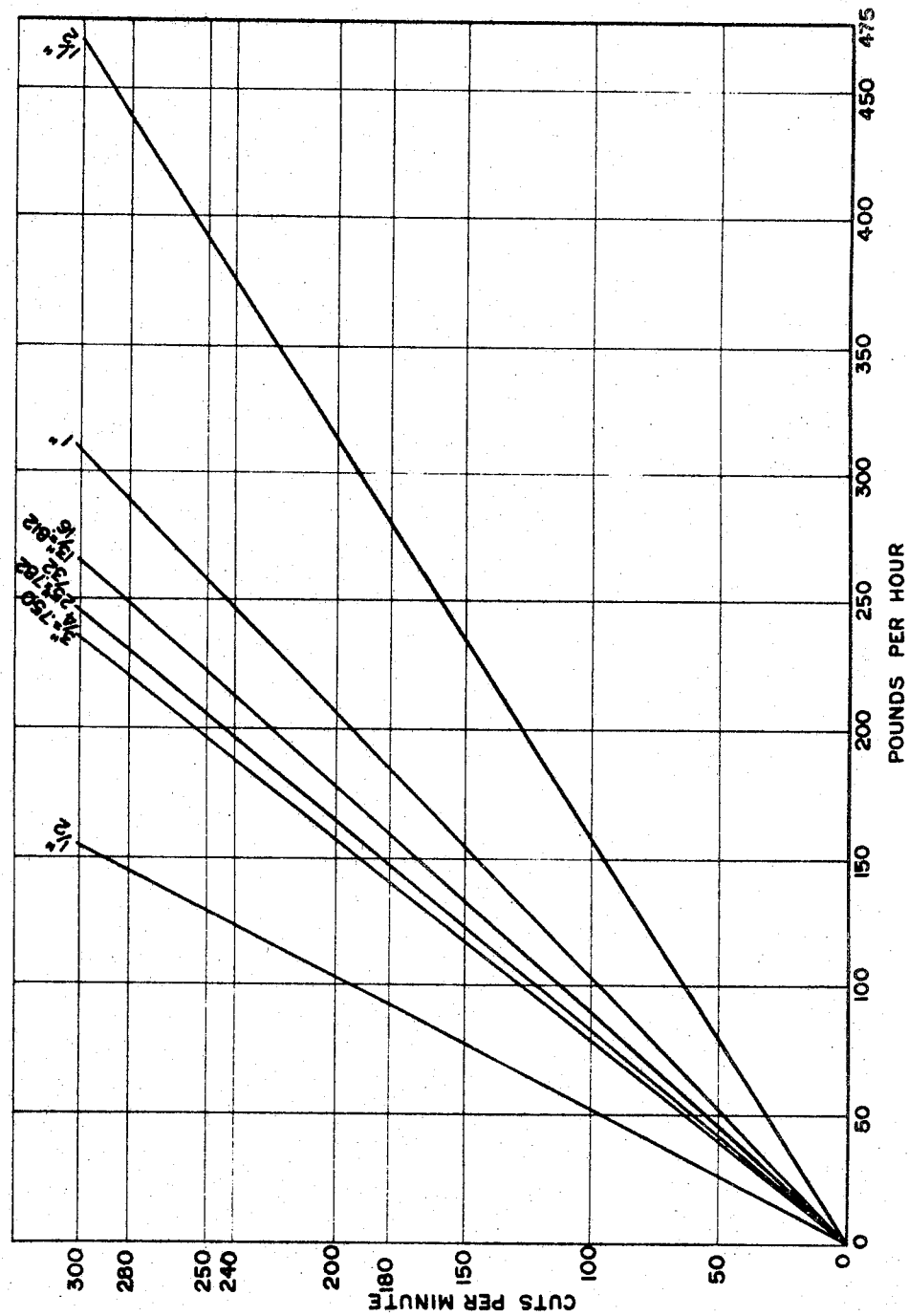

United States Patent Office 3,416,983
Patented Dec. 17, 1968

3,416,983
METHOD AND APPARATUS FOR MAKING HONEYCOMB
Roger C. Steele, Lafayette, Calif., assignor to Hexcel Corporation, Berkeley, Calif.
Filed Mar. 16, 1964, Ser. No. 352,049
16 Claims. (Cl. 156—197)

ABSTRACT OF THE DISCLOSURE

A method and apparatus for making honeycomb including one or more webs continuously driven through the machine, periodically interrupted adhesive lines applied to the web, the leading end web stopped, a ribbon of desired honeycomb thickness cut from the web along the interruptions in the adhesive lines, and the ribbons stacked and adhered together in face-to-back relationship. The web is held against a shearing bar by vacuum ports in the shearing bar and a wobble action is provided to the shearing bar progressively to shear the web and clear the stationary and movable shear blade parallel to one another for immediate advance of the web.

---

The present invention relates in general to method and apparatus for manufacturing expandable material and more particularly to a method and apparatus for making unexpanded blocks of expandable honeycomb.

While, for purposes of illustration, the invention will be described hereinafter as a method and apparatus for making honeycomb, the invention comprehends the manufacture of unexpanded blocks of expandable material wherein ribbons are cut from the forward end of substantially continuously running webs of material and stacked together to form a block of ribbons. By utilization of the present invention it is possible to produce a continuous length of expandable material cut within close tolerances to desired thickness. Furthermore, with the present invention it is possible to produce different expandable materials which, upon expansion, have different characteristics. For example, honeycomb structures of different thickness and cell size can be produced.

In practicing the method according to the present invention, to be described in greater detail below, spaced apart, parallel lines of adhesive, preferably periodically interrupted, are applied longitudinally to at least one side of a continuously moving web of material with the periodic interruptions in the adhesive lines forming adhesive-free regions extending across the web. The forward end portion of the web is periodically stopped, and while stopped, an adhesive-lined ribbon of material is cut from the web along the adhesive-free regions.

In the preferred embodiment of this invention, webs of material are adhesive-lined and cut in pairs although it is possible to utilize other even numbers of webs and even a single web as pointed out in greater detail below. For convenience, in certain instances hereafter in the specification and claims the word "web" will be used to mean a single web, pairs of webs or multiple webs and should be so interpreted where applicable.

The pair of cut ribbons is added to a stack of previously cut pairs. The ribbons in this stack are adhered to one another along the parallel lines of adhesive to form an expandable block of material. When the lines of adhesive adhering the obverse face of each ribbon to its confronting ribbon are disposed in staggered parallel relationship to the lines of adhesive adhering the reverse face to its confronting ribbon, the block of material when expanded will form a honeycomb structure. In accordance with the present invention apparatus is provided which will perform the method described above.

The periodically interrupted lines of adhesive which leave these adhesive-free regions are formed in accordance with the present invention by an adhesive manifold which extends the width of the web and is provided along its length with a plurality of equally spaced apart adhesive orifices. Means is provided for periodically relieving a slight pressure that is maintained on adhesive material in the manifold thereby to periodically interrupt the flow of the adhesive material through the manifold orifices and onto the web. The manifold is provided with several series of such orifices so that by bringing a different series into engagement with the web, adhesive lines spaced apart by a different distance can be produced, thereby to produce a honeycomb structure with a different cell size. Since the adhesive is contained within a substantially entirely closed system only the flow of adhesive need be turned off when the honeycomb making machine is stopped instead of having to perform an entire clean up as is necessary with conventional adhesive application systems which include adhesive applicator rollers which contact the web material.

In order to maintain close tolerances for thin honeycomb structures produced with the present continuous manufacturing process, the same amount of material must be fed into the final cutting assembly during each cycle of the cutting assembly, and therefore, it is desirable to have the speed of the web material into the terminal portions of the machine maintained substantially constant and not affected by variations in the tension on the web in the initial stages of the machine. Therefore, a drive mechanism is provided ahead of the terminal portions of the machine to maintain a substantially constant web speed in the terminal portions and still allow for varying tension on the web material in the machine ahead of the drive mechanism. In accordance with this aspect of the present invention, two substantially identical, spaced apart rollers are positively driven at the same speed, and a third floating roller, around which the web material is wrapped, is provided between and in contact with these two driven rollers. The web material is threaded around the first of the driven rollers, over the floating roller and then around the second driven roller. With this construction increased tension on the web forces the floating roller tighter against the web moving around the driven rollers to prevent slippage.

In order repeatedly to cut ribbons of substantially equal size from the end of the web and to make these cuts along the adhesive-free regions, the end of the web must be precisely stopped and started. One stopping and starting mechanism according to the present invention includes a brake which is periodically brought into contact with the web and drive means positioned between the brake and the cutting means for driving the web to a speed faster than the speed of the web in the remainder of the machine whereby slack created during the braking action is taken up before the end of the web is again stopped by the brake. Another stopping and starting structure in accordance with this invention includes a pair of drive rollers engaging the web and drive means connected to the drive rollers to drive the rollers from rest to a speed substantially greater than the speed of the web through the remainder of the machine for a period of time necessary to take up slack in the web and to stop the web after the desired amount of web has moved past the cutting means.

As still an additional feature of the present invention the honeycomb making machine includes a shear blade and a shear bar disposed on opposite sides of the web and means for independently advancing and retracting the opposite ends of the shear blade past the shearing edge of the shear bar whereby the web is progressively sheared thereacross and the shear blade retracted in such a manner that when the shear blade is withdrawn past the cutting edge of the shear bar the two shearing members are substantially parallel. With this construction a new length of web can immediately be advanced between the shear blade and shear bar in order to maintain the stroke of the movable shear blade at a minimum so as to cut ribbons of web material as fast as possible.

Another feature of the present invention is to hold the web against the shear blade so that after a ribbon has been cut from the web the ribbon is held against the shear blade until the ribbon has been forced against the stack of previously cut ribbons. Then the ribbon is removed from the blade as the blade is retracted. In accordance with this aspect of the invention, the shear blade is provided with a plurality of air passages disposed along its length, and means are provided for drawing air through the passages from the time the web is brought in contact with the shear blade until the ribbon has been forced against the stack of previously cut ribbons when the shear blade begins to retract. At this point air is blown outwardly through the passages to prevent the cut ribbon from being retracted with the shear blade.

Other objects, features and advantages of the present invention will become apparent upon reading the following specifications and referring to the accompanying drawings in which similar characters of reference represent corresponding parts in each of the several views.

In the drawings:

FIG. 1 is a schematic side elevational floor line view, broken in two, showing schematically a honeycomb manufacturing assembly line utilizing the features of the present invention;

FIG. 2 is an enlarged side view, partially in section, of the portion of FIG. 1 delineated by line 2—2 and illustrating a portion of the adhesive application assembly;

FIG. 3 is a side elevational view, partially broken away, schematically illustrating the adhesive applicator according to the present invention;

FIG. 4 is a side elevational view of the web braking and cutting assembly according to one embodiment of the present invention;

FIG. 5 is a plan view of the driving assembly illustrated in FIG. 1 and taken along line 5—5;

FIGS. 6A–E are schematic views illustrating the operation of the cutting assembly according to the present invention;

FIG. 7 is a perspective view, partially in section and partially in phantom, illustrating the shear blade and schematically illustrating means for drawing the web to the shear blade and blowing the cut ribbons from the shear blade;

FIG. 8 is an enlarged side elevational view, partially in phantom, showing the stacking assembly in accordance with the present invention;

FIG. 9 is a view of the portion of the stacking assembly shown in FIG. 8 taken along line 9—9;

FIG. 10 is a schematic drawing illustrating the connections between the driven mechanism for various portions of the honeycomb manufacturing machine;

FIG. 11 is a side elevational view of an alternative web stopping and starting structure;

FIG. 12 is a graph illustrating the operating characteristics of the structure shown in FIG. 11;

FIG. 13 is a graph illustrating the operating characteristics of a typical machine constructed in accordance with the present invention;

FIG. 14 is a schematic side view of an alternative structure for printing interrupted adhesive lines on a web of material; and FIG. 15 is a plan view of a sheet of web material printed on one side with staggered parallel lines of adhesive.

While the invention will be described below as utilized for production of paper honeycomb from paper web material and a "wet line" adhesive, the method and apparatus according to the present invention is equally applicable for the production of honeycomb from other materials such as, for example, metal foil, plastic web, resin impregnated fabric and the like. In certain portions of the following description, elaboration will be made as to alterations that might be useful or necessary in the production of honeycomb from materials other than paper.

The word "adhesive" is utilized hereinabove and hereinafter to include "wet line adhesive," "dry line adhesive," or any other bonding agents in wet or dry form or contained in solvent solutions. The term "dry line adhesive" is typically used to refer to and designate those types of adhesive which can be advanced through drying or polymerization, or a combination of both, from a liquid first stage to a relatively dry, non-tacky second stage, then to a temporary flowable or tacky third stage and thence to a relatively dry, infusable fourth stage. One specific type of dry line adhesive which has been found to be particularly satisfactory in producing honeycomb according to the present invention is a modified phenolic. When such dry line adhesives are used, the adhesive application assembly A includes a suitable oven for advancing the adhesive to its relatively dry, non-tacky second stage.

Referring now to FIG. 1 of the drawing, the honeycomb manufacturing assembling illustrated there utilizes features of the present invention and includes an adhesive application assembly A, a main drive assembly B, a braking and accelerating assembly C, a cutting assembly D, a compression and adhesive curing assembly E, and additional assemblies to be described in greater detail below.

Two continuous webs 8 and 9 of the material out of which the honeycomb is to be made are continuously drawn from rolls 10 over tensioning rollers 11 by the main drive assembly B. The first of these webs 8 is passed through the adhesive application assembly A in which spaced apart parallel lines of adhesive are provided in staggered relationship on opposite sides of the web. The adhesive application assembly is described in greater detail below with reference to FIGS. 2 and 3. The adhesive-lined web 8 passes over an adjustable position idler roller 12 and a tension control roller 13 to the drive assembly B. The second web 9 passes over an idler roller 14 and a tension control roller 13' to the drive assembly B. Each of the tension control rollers 13 and 13' is rotatably mounted on one end of a pivoted arm, the opposite end of which is connected to a tension control device 15 whereby the tension on the webs 8 and 9 upon passing over the rollers 13 and 13' is sensed and the amount of tension applied to the webs by the tension control rollers 11 adjusted to maintain a substantially uniform tension on the webs in the machine.

At the main drive assembly B the adhesive-lined web 8 and the adhesive-free web 9 are moved into contacting relationship with one adhesive-lined surface of the first web 8, confronting a surface of the second web 9. The main drive assembly B includes substantially identical, spaced apart, first and second lower drive rollers 16 and 17 of a non-resilient material such as steel and an upper floating roller 18 of a resilient material such as rubber positioned between and in contact with the drive rollers 16 and 17. The combined webs 8 and 9 are wound counterclockwise around the drive roller 16, upwardly clockwise around the floating roller 18, and then down counterclockwise around the drive roller 17. The drive rollers 16 and 17 are driven at identical speeds by, for example, interconnected spur gears driven from a main drive as shown in FIG. 10. The axle of the floating roller 18 is slidably mounted in a vertical channel centered on the vertical center line between the two drive rollers 16 and 17 so that the floating roller can slide up and down to accommodate various web thicknesses, to permit threading of the web through the drive assembly B and to press the web against the drive rollers 16 and 17 with a force proportionate to the amount of tension on the web. The two drive rollers 16 and 17 are slotted in the regions of the adhesive lines on the top surface of the web 8 as shown in FIG. 5 to prevent smearing of the adhesive.

From the drive assembly B the combined webs 8 and 9 pass over an idler roller 19 and then through a pair of overdrive rollers 20 to the braking and accelerating assembly C. The overdrive roller in contact with the adhesive-lined side of the pair of webs is slotted in the same manner as the drive rollers 16 and 17. These overdrive rollers which are designed to drive faster than the drive rollers 16 and 17 and slip against the web so as to drive the web into the braking and accelerating assembly at the speed permitted by the drive rollers 16 and 17.

The braking and accelerating assembly C includes a brake 21 operated in conjunction with the cutting assembly D and a pair of overdrive accelerating rollers 22 driven faster than drive rollers 16 and 17 and designed to slip against the held web for accelerating the stopped web after the brake is released, thereby to take up all the slack created in the web during the braking action and before the succeeding braking action. The operation of the braking and accelerating assembly C is described in greater detail below with reference to FIG. 4.

When the web material is periodically stopped by the brake 21, the forward end portion of the web lies between a fixed shear bar 23 and a movable shear blade 24 in the cutting assembly D. The movable shear blade 24 is actuated by a drive mechanism 25 described in greater detail below with respect to FIGS. 6A–E to cut a narrow ribbon of adhesive-lined material from the forward end portion of the web, the cut being made along the adhesive-free region across the web.

Repeated cutting of ribbons from the end of the web produces a compressed stack 26 of vertical ribbons or sheets supported on a table composed of support bars 27 which are lined up in a direction normal to the length of the ribbons and extend from underneath the fixed shear bar 23 away from the movable shear blade 24. This stack of cut sheets 26 is held under compression between restraining rolls 28, bars 27 and pressure arms in the compression assembly E described in greater detail below with reference to FIGS. 8 and 9. The stack of compressed sheets 26 in the compression assembly E behind the shear bar 23 is housed in an oven 29 which sets the lines of adhesive to bond adjacent sheets in the stack to one another.

The web material is continuously driven through the assembly described above by the main drive assembly B and the forward end of the web is periodically stopped and ribbons cut therefrom to produce the stack of sheets which when bonded together constitutes a block of honeycomb before expansion. When a run of material is initially begun, the webs 8 and 9 are threaded through the machine and drive assembly B operated with the actuating mechanism for the cutting assembly D disengaged until sufficient web material has been run through the machine so that adhesive-lined material reaches the cutting assembly. For this initial run of adhesive-free material, a pair of scrap drive rollers 31 is provided beneath the cutting assembly D to pull the web through the cutting assembly D until such time as the actuating mechanism for the cutting assembly is engaged.

Following the formation of the continuous block of honeycomb before expansion, a number of processes can be carried out in a continuous assembly line. For this purpose, a pair of recompression rollers 32 are provided above and below the stack of sheets some distance away from the restraining roll 28 so that honeycomb in a stage of partial expansion can be stored in a storage area F to compensate for differences in the operating speeds or shutdowns in the honeycomb fabricating assembly and in other assemblies further along the line. This storage area F can hold up to, for example, one hour's production of honeycomb before expansion. As the amount of honeycomb stored in this area decreases the stored block of honeycomb is partially expanded and is then recompressed by the recompression rollers 32 which force the sheets against a restraining bar 33.

After the honeycomb has been recompressed, it can be rolled on reels or flaked on pallets for shipment to destination if the honeycomb is desired in unexpanded condition at the destination.

If, on the other hand, the continuous block of unexpanded honeycomb is desired to be processed into expanded honeycomb, it is passed into an expanding and curing assembly generally indicated at H which, for example, includes fast revolving belts 41 which pull the honeycomb from the restraining bar 33 to open up the cells. The expanded honeycomb is passed through a curing or heat sealing oven 42 to set the honeycomb in expanded condition.

If it is desired to produce a sandwich construction with expanded honeycomb serving as the core of the sandwich, adhesive is applied to the edges of the expanded honeycomb by an adhesive spreader assembly J which includes, for example, adhesive-coated rollers 43 which contact the top and bottom surfaces of the expanded honeycomb. Then face sheets or skins are applied to the adhesive-coated honeycomb core in a facing assembly K in which facing material is unwound from a roll 44, passed over an idler roller 45 and then moved into contact with the edges of the honeycomb core by means of a belt 46 revolving around rollers 47, 48 and 49.

If the honeycomb sandwich structure is to contain a foam material or other substance, this material is dropped from a hopper 51 into the expanded honeycomb cells after the lower face skin has been applied to the core structure. The adhesive holding the face skins to the core is cured in a curing oven 52 and the finished honeycomb passed along a conveyor by means of a drive belt 53 for shipment to destination. The completed honeycomb sandwich structure can be cut into sections for shipment by, for example, a traveling saw 54.

Referring now to FIGS. 2 and 3, the adhesive application assembly A according to the present invention, includes a pair of adhesive distributing manifolds, 61 and 61' which are adapted to contain adhesive under a slight pressure for application of spaced apart, periodically interrupted parallel lines of adhesive longitudinally on opposite side of the web material. The web material 8, after passing through the tensioning rollers 11 is directed along a substantially horizontal path passing over the top surface of the manifold 61 by means of a pair of spaced apart idler rollers, a roller 62 underneath the web before the adhesive lines are applied and a roller 62' above the web after the adhesive lines are applied. The manifold 61, which for purposes of illustration is shown as having a substantially square cross-section, is provided along its top surface with a plurality of equally spaced apart orifices 63, each of which is surrounded in the top surface of the manifold by a recess 64 extending to the trailing edge of the manifold 61. During operation, liquid adhesive contained in the manifold 61 under a slight pressure flows out through the orifices 63 and onto the web traveling thereacross, the width of the adhesive line that is applied to the web being substantially defined by the width of the recess 64.

One end of the manifold 61 is rotatably supported by a fluid type rotatable joint 65 on one side of a chamber 66 containing a centrally mounted diaphragm 67. The adhesive in the manifold 61 comes in direct contact with one side of the diaphragm 67, and on the other side the central portion of the diaphragm 67 is connected to one end of an actuation lever arm 68 rotatably supported between its ends for moving the diaphragm in much the same manner as an automobile fuel pump. A cam roller 71, the position of which is shifted by a cam surface 72 on a cam shaft 73 is provided on the other end of the arm 68. As the cam shaft 73 rotates, the cam moves the roller 71 and the arm 68 to displace the diaphragm 67 and temporarily reduce the pressure within the manifold 61. This temporary reduction in pressure interrupts the flow of adhesive through the orifices 63 and therefore interrupts the lines of adhesive applied to the web 8. The adhesive is supplied to the manifold 61 by a conduit 74 from a supply tank 75 in which the adhesive is maintained under a pressure to establish a flow of adhesive through the orifices 63, which flow of adhesive is interrupted by movement of the diaphragm 67.

The web 8 which is lined with adhesive on its lower surface when passing around idler wheel 62' is then turned over to place the adhesive lines on the web top surface and is again passed along a substantially horizontal path between an adjustable position idler roller 76 positioned below the web and an idler roller 77 positioned above the web further along the web travel. While the web is passing along this horizontal path additional lines of adhesive are applied to the bottom web surface by the second manifold 61', and the roller 77 is grooved in these adhesive-lined regions to avoid smearing the adhesive. The location of the orifices in the top surface of the manifold 61' is staggered with respect to the location of the orifices in the top surface of the manifold 61, whereby the lines of adhesive on opposite sides of the web material are applied in staggered parallel relationship to one another.

Additional series of orifices are provided on the other flat surfaces of the manifolds 61 and 61', and at each of the series the orifices are equally spaced apart by a different distance for applying adhesive lines spaced apart by different distances to produce honeycomb structures with different cell sizes. When changing the cell size of the honeycomb produced by the machine the manifolds 61 and 61' are rotated to bring the series of orifices with the desired spacing into contact with the lower surface of the web and all other series of orifices are covered by, for example, tape. In practice it is desirable to hold the web material against the top surface of the manifolds 61 and 61' by a roller or a plurality of spring fingers (not shown).

The length of the adhesive lines between interruptions is determined by the speed of the web passing across the manifolds 61 and 61' and the duration of one revolution of the cam shaft 73, the length of the interruption being dependent upon the length of time the pressure within the manifolds 61 and 61' is reduced by cooperation of the roller 71 and the cam 72 on the cam shaft 73. The roller 71 is slidably mounted in a slot 69 in the arm 68, and by adjustment of the position of the roller 71 in the slot 69 the length of time during which the roller 71 and cam 72 cooperate to produce a reduction of pressure within the manifold can be changed as desired. Obviously, other means can be provided for accomplishing this adjustment.

It is apparent that a change in the speed of the work material or the duration of a rotation of the cam shaft 73 will alter the relative positions of the adhesive lines applied to the opposite surfaces of the web material by the manifolds 61 and 61'. Therefore, by adjusting the position of the idler wheel 76, the web travel length between the manifold 61 and the manifold 61' can be changed to produce a desired length whereby the adhesive-free regions, due to interruptions in the adhesive lines and extending transversely of the web material, will coincide on opposite surfaces of the web material.

While the manifolds 61 and 61' have been described as having a square cross-section, they can have any other desired configuration such as having a circular cross-section.

The thickness of the final unexpanded honeycomb structure which is determined by the width of the ribbons or sheets in the compressed stack 25 can be varied by changing the speed of the web material passing through the machine and/or by changing the period of the braking and accelerating assembly C and the cutting assembly D. When this is done, in order to ensure that the cut made across the web material at the cutting assembly D is made in the adhesive-free regions, the length of travel of the web material from the adhesive application assembly to the cutting assembly must be properly adjusted. The length of this travel is adjusted by changing the position of the adjustable position idler roller 12 between the adhesive application assembly A and the main drive assembly B.

Referring now to FIG. 4, the brake 21 of the braking and accelerating assembly C positioned between the overdrive rollers 20 and the cutting assembly D includes a bearing plate 81 which is shown by way of illustration as having a square cross-section and which is removably mounted on the main frame of the machine so that it can be removed and rotated to change the surface facing the web. Each of the surfaces of the bearing plate 81 is provided with a series of spaced apart grooves corresponding to a series of spaced apart adhesive orifices in the manifold 61 so that when the web material is braked against the surface of the bearing plate 81 the glue lines do not actually come in contact with the plate 81, and the bearing surface of the plate 81 changed appropriately when the manifolds 61 and 61' are changed for different spaced apart adhesive lines.

The bearing plate 81 is mounted on a mounting bracket 84 by means of a screw 83 and a lock nut 82. One end of the mounting bracket 84 is rotatably mounted on the frame of the machine via a shaft 85 for rotational movement away from a position in which the bracket 84 lies parallel and adjacent to the coated web. The bracket 84 is biased toward the position adjacent the coated web against a stop member (not shown) by means of, for example, a coiled spring 80 which bears against the bracket 84 and against a surface of a support member 80' rigidly secured to the frame of the machine. The position of the bearing plate 81 with respect to the web is adjusted by means of the screw 83 and lock nut 82.

On the side of the coated web opposite that on which the mounting bracket 84 is mounted, a brake arm 86 is rotatably supported at its one end on the shaft 85 and provided on its other end with a brake bar 88. The end surface 88' of the brake bar 88 lies parallel and adjacent to the bearing surface of the bearing plate 81 with the web material passing therebetween. The brake arm 86 is rotated about the shaft 85 by means of a cam 87. Rotation of the cam 87 causes the cam surface 87' to engage the brake arm 86 and move the braking surface 88' of the brake bar 88 toward the bearing plate 81 to pinch and stop the web material therebetween.

During the braking action, the mounting bracket 84 is slightly rotated on the shaft 85 against the pressure of the spring 80, and since the right-hand overdrive roller 22a of the overdrive rollers 22 is mounted on the bracket 84, the overdrive rollers 22 are caused to separate and no longer drive against the web when the web is stopped.

When the web material is periodically stopped by the braking assembly, a slack loop is formed between the brake and the overdrive rollers 20 as the drive assembly B continues to drive the web, and a pad 89 aligned with the web path directly between the brake and the rollers 20 on the adhesive-free side of the web insures that the slack will always form in the same direction, i.e., away from the pad 89.

In the cutting assembly D, the cutter bar 24 is provided with a cutting edge 91 which is actuated by a drive assembly illustrated in greater detail in FIG. 6A for creating a shearing action with a cutting edge 92 of the fixed shear bar 23 to shear the stopped web. The movable shear blade 24 is driven from a crank shaft 93 which is provided with cranks 94 and 95, the position of the crank 94 being advanced approximately 35–40° about the crank shaft 93 from the crank 95. Connecting rods 94' and 95' which include a pivot joint (not shown) in their midsection to allow for slight lateral movement of the blade 24 are rotatably secured at one of their ends to the movable shear blade 24 and at the other of their ends to the respective cranks of the crank shaft 93 for reciprocating the movable shear blade in the manner described below with reference to FIGS. 6A–6E. The crank 93 is driven through a clutch (not shown) and a cutter flywheel, to be described below with reference to FIG. 10.

On one end of the crank shaft 93 there is mounted a flywheel 96 provided with a peripheral cam surface 97. A cam roller 98 which is rotatably mounted at the end of a guide actuating rod 99 rides on the cam surface 97 and is spring-biased against this cam surface by a spring 102 positioned between the cam roller 98 and an actuating rod mounting bracket 101. As the crank shaft 93 rotates to operate the movable shear blade 24, the flywheel 96 rotates to reciprocate the guide actuating rod 99 to contact a guide 104 which is rotatably mounted on the frame between the brake 21 and the stationary shear bar 23. This guide 104 is provided with a slot 105 through which the web material passes and within which one face is grooved at the web adhesive line. The rotatably mounted guide 104 is spring biased by a spring 106 so that with the shear blade 24 retracted, the lower edge of the guide 104 adjacent the cutting edge 92 of the stationary shear bar 23 is spaced from the cutting edge 92. In this position when web material is advanced through the guide and past the cutting edge 92, the web material is maintained out of contact with the cutting edge 92 so that no adhesive is wiped off onto the cutting edge 92. However, after the web material has been stopped by the brake 21 with an adhesive-free region across the web material lined up with the cutting edge 92 and as the movable shear bar 24 advances, the guide actuating rod 99 rotates the guide 104 so that the web material is positioned against the cutting edge 92 for obtaining an accurate cut.

When the spacing between the adhesive lines is changed, such as by rotation of manifolds 61 and 61', it may be necessary to make changes in the other rollers which contact the adhesive-lined side of the webs so that the adhesive is not smeared on the rollers. In the arrangement described thus far, when an adhesive line spacing is changed, a change may have to be made in the following elements: adhesive roller 77, movable idler roller 12, tension control roller 13, drive rollers 16 and 17, the right-hand overdrive roller 20 and accelerating roller 22, the bearing plate 81 and the right-hand face of the guide member 104. These elements can be provided with many slots such as, for example, on ½" centers.

Since the spacing between adhesive lines on each side of a web is twice the expanded honeycomb cell size, rollers with slots spaced on ½" centers can be utilized to manufacture honeycomb with ¼", ½", ¾", 1", 1½", etc. cells, it being only necessary to move approximately one-half of the rollers laterally in order to produce honeycomb with ¼" cells. Alternatively, smooth rollers can be utilized with spaced apart resilient rings, such as, for example, of rubber, which can be moved to the desired positions for contacting the web between adhesive lines.

Referring now to FIGS. 6A–E, there is shown a schematic drawing of the operation of a movable shear blade 24 according to the present invention. In order to progressively shear the web material across its width in a scissors action with a minimum stroke, the ends of the shear blade 24 are independently actuated by connecting rods 94' and 95'. As shown in FIG. 6A, with the shear blade 24 in its restracted position, the end of the connecting rod 94' is advanced an initial short distance such as, for example, ⅜" ahead of the connecting rod 95' for a typical 4-foot shear blade. Since the crank 94 is advanced ahead of the crank 95 by approximately 35–40°, the connecting rod 94' first moves ahead a short distance which is preferably arranged to be equal to the initial lead, i.e. ⅜", before the whole shear blade 24 is moved forward by both of the connecting rods 94' and 95'. Thus, as shown in FIG. 6B, when the shear blade 24 begins its shearing action, one end of the shear blade 24 is advanced ahead of the other end of the shear blade approximately ¾", twice the initial lead in its retracted position as shown in FIG. 6A. As shown in FIG. 6C, the connecting rods 94' and 95' advance until a ribbon has been cut from the web material, and the connecting rods continue to advance to force this ribbon against the other ribbons in the stack of ribbons 26. Then, as shown in FIG. 6D, the connecting rod 94' reaches its forwardmost position while the connecting rod 95' continues to advance so that the connecting rod 94' then only leads the connecting rod 95' by its initial lead, i.e., in this example, ⅜". As the crank shaft 93 continues to rotate, the connecting rod 94' begins to retract before the connecting rod 95' and moves backward by its lead length, i.e. approximately ⅜", before the connecting rod 95' begins to retract so that the shear blade 24 is retracted with its cutting edge 91 parallel to the cutting edge 92 of the fixed shear bar 23. Thus, as movable shear blade 24 is retracted, it clears the fixed shear bar 23 parallel thereto so that the braking assembly can immediately release the web material for advancement by the accelerating rollers 22 between the shear blade 24 and shear bar 23. This construction permits a minimum stroke per cycle to the movable shear blade 24 for maximum cutting speed and efficiency. This feature of the present invention is of increasing importance with wider webs of material which naturally require a wider and therefore more massive movable shear blade.

As an additional feature of the present invention, the movable shear blade 24 is provided with a number of spaced apart air passages 121 which are disposed along the length of the blade 24, and the passages 121 at the leading end of the blade 24 are connected through a manifold 122 and conduit 123 to an air cylinder 124 while the air passages at the other end of the blade are connected through a manifold 122' and a conduit 123' to an air cylinder 125. The respective piston rods 124' and 125' of the air cylinders 124 and 125 are connected at their exterior end to a common mounting pin 126 projecting from the flywheel 96, and the opposite ends of the cylinders 124 and 125 are spaced apart and anchored to a piston mounting bracket 127 rigidly secured to the frame of the machine.

As the flywheel 96 rotates, the pistons in the air cylinders 124 and 125 reciprocate to alternately draw air in through the passages 121 and then blow air out through the passages 121. The position of the pin 126 is synchronized with the operation of the movable shear blade 24 so that as the web is brought into contact with the shear blade, air is drawn in through the passages 121 to hold the ribbon in contact with the shear blade until the ribbon has been forced against the stack of previously cut ribbons. As the shear blade 24 reverses its direction, so do the pistons in the air cylinders 124 and 125 to blow air out of the passages 121 as the blade is retracted. In this manner, retraction of the cut ribbon with the shear blade is prevented. Since the ends of the cylinders 124 and 125 are spaced apart, and the ends of the piston rods 124' and 125' are connected to the common pin 126, the cycle of one of the pistons 124' is advanced with respect to the other piston 125', and the piston with the advanced cycle is connected to the passages 121 at the leading end of the blade 24 while the other piston is connected to the passages at the trailing end of the blade 24.

Referring now to FIGS. 8 and 9, there is shown the mechanism according to the present invention for maintaining the end of the stack of cut ribbons 26 under compression during curing of the adhesive lines. This compression assembly E includes L-shaped pressure arms 131, rotatably mounted between certain of the support bars 28 by a shaft 132 which passes through an aperture in the corner of the L of the arms 131. The arms 131 include a pressure extension 133 adapted to lie along the top surface of the bars 28 and apply pressure upwardly to the stack of compressed sheets 26 and an actuation extension 134 which is biased by a spring 135 against a cam shaft 136. The end of the pressure extension 135 lies adjacent the end of the support rods 28 for applying pressure on all of the cut ribbons lying between the support rod 28 and the fixed shear bar 23. A second set of L-shaped pressure arms 131' supported on a shaft 132' and having extensions 133' and 134' is provided with the extensions 133' facing the opposite direction from the extensions 133 on the arms 131 for applying pressure to a different portion of the compressed stack of ribbons 26.

The cam surface of the cam shaft 136 engaging the different pressure arms 131 and 131' is arranged such that during a portion of the revolution of the cam shaft 136, the pressure extensions 133 and 133' are moved away from the stack 26 of cut ribbons for relieving the pressure applied to the stack by these arms. Rotation of the shaft 136 is ganged with the operation of the movable cutting bar 24 so that the pressure on the stack 26 by the arms 133 and 133' is reduced as the movable shear blade 24 approaches its forwardmost position, at which point, the blade 24 is the element applying compression forces to the stack 26 of cut ribbons. As soon as the blade 24 reaches its forwardmost position, the pressure extensions 133 and 133' are again brought into contact with the lower edge of the stack 26 of cut ribbons to maintain pressure on the stack. Since different portions of the blade 24 along its length reach their forwardmost position at different times, the cam surfaces of the cam shaft 136 will differ for the pressure arms 131 and 131' along the width of the stack of cut ribbons.

The lower edge of the movable shear blade 24 is provided with a plurality of slots 137 to receive the support rods 28 and pressure arms 131 so that portions of the bar extend the full width of the ribbon being cut and below the top surface of the rods 128 when the movable shear bar 24 is in its forward-most position thereby to fully compress the stack of cut ribbons 26.

A pressure plate 138 which is shown in FIG. 8, and which applies pressure on top of the stack of cut ribbons behind the shear bar 23 maintains the portion of the compressed stack of ribbons 26 from the back of the shear bar 23 to the compression rollers 28 under compression while the adhesive is cured. The cut sheets are driven past the plate 138 by the compression force applied to the stack by the shear blade 24 at the forward end of its stroke.

Referring now to FIG. 10, there is shown a schematic illustration of the drive connections to the major assemblies of the honeycomb manufacturing machine. A main drive shaft from a motor (not shown) is provided with a sprocket 161 which drives a brake flywheel 162 and a cutter flywheel 163 by means of a drive chain 164 which also passes over an idler wheel 165. A number of change gears 166 driven by the main drive in connection with, for example, the brake flywheel 162 are used to drive the main drive rollers 16 and 17 which are provided with interconnected spur gears 167 and 168. The speed of the drive rollers 16 and 17 can be changed with respect to that of the braking and cutting assemblies by changing the change gears 166. The cutting assembly is driven by the cutter flywheel 163 through a clutch (not shown). This clutch permits the shear blade 24 to be disengaged during the preliminary run of web material through the machine until adhesive-lined web material reaches the cutting assembly.

Referring now to FIG. 11, there is shown an alternative structure for periodically stopping only the forward end portion of the web material. The bottom web 140 of two webs 140 and 141 is free of adhesive and travels around a portion of an idler roller 142 and over the lower 143 of two suction drive type rollers 143 and 144 of exactly the same diameter. These two rollers are provided with a pervious surface as, for example, of a honeycomb material and the web wraps around approximately 180° of the roller. The interior of the roller is divided into two 180° section chambers connected to a vacuum pump through the roller support to hold the web material against the roller. The top web material 141 which has adhesive lines applied on both sides thereof, passes around a grooved idler roller 145 and over the upper suction roller 144 which also has grooves around its circumference to accommodate the adhesive lines on the web.

The two webs 140 and 141 are combined by a resilient grooved roller 146 as of, for example, rubber, which compresses the two webs together as the bottom web 140 leaves the lower suction roller 143. Right and left overdrive rollers 147 and 148 respectively are provided between the drive rollers 143 and 144 and the cutting assembly C to maintain tension on the web material leaving the drive rollers. These rollers 147 and 148 are overdriven and slip on the web material. Typically, both of these rollers are made of a resilient material such as, for example, rubber and the right roller 147 is grooved along the adhesive lines.

Between the rollers 146 and 148 and the cutting assembly C, a braking and accelerating assembly B' is provided and includes an output shaft 151 from an index drive which, by way of example, can include an indexer. This output shaft 151 is connected by means of change gears 152 and 153 to a pair of drive rollers 154 and 155 of a resilient material such as rubber, the right-hand roller 155 being grooved along the adhesive lines of the web. As seen from FIG. 12, the output shaft 151 from the index drive serves to drive the rollers 154 and 155 to advance a desired amount of web material and stop the web material for the cutting operation of the cutting assembly C. The drive rollers 154 and 155 are accelerated to a substantially greater speed than the speed of the continuously moving web material through the remainder of the machine to take up the slack in the web material between the rollers 154 and 155 and the overdrive rollers 147 and 148 which accumulates during stoppage of the drive rollers 154 and 155. As seen in FIG. 12, typical operation can be performed with the indexing or accelerating and stopping done in 120° of the machine cycle and of advancing and cutting one ribbon and a stop or dwell period which consumes the other 240° during which the cutting operation takes place. The drive gears 152 and 153 between the output shaft 151 and the drive rollers 154 and 155 are selected so that the exact amount of material required for each machine cycle is advanced during the index period.

The braking and accelerating assembly is operated as follows, as illustrated in FIG. 12. At the end of the dwell period, the output shaft 151 starts to turn and accelerate the rollers 154 and 155 which have been stopped and holding the forward end portion of the web stopped during the previous cutting operation. These drive rollers 154 and 155 pull most of the slack out of the web as they achieve their maximum speed and start slowing down. While these rollers 154 and 155 are still slowing down and before their peripheral speed has been reduced to the speed of the drive rollers 143 and 144, the web material is pulled taut and the rollers 154 and 155 skid on the web material for a few degrees (typically 2°–25°) of the operating cycle. Slippage stops when the peripheral speed of the drive rollers 154 and 155 matches that of the drive rollers 143 and 144, and then the drive rollers 154 and 155 decelerate for a predetermined length of time to a stop at the end of the index period, the desired amount of web material having been fed past the shear bar 23 during this index. As the drive rollers 154 and 155 stop, slack will begin to accumulate in the web ahead of these rollers. The cutting operation of the cutting assembly then takes place during the dwell or stop period of the index drive during which period the drive rollers 154 and 155 hold the web for the cutting operation. Obviously, rather than having the rollers 154 and 155 skid on the web material for a few degrees this slippage can be accommodated by utilization of slip clutches between the rollers 154 and 155 and the output shaft 151 from the index drive.

The operation of the honeycomb manufacturing method and apparatus has been described with respect to the application of adhesive lines to opposite sides of one web which is combined during the honeycomb manufacturing process with an adhesive-free web. Obviously, other arrangements could be used such as, for example, the use of two or more sheets of web material, each of which is adhesive-lined on one side thereof or the use of a single sheet of web material adhesive-lined on at least one side thereof in combination with means for laterally displacing adjacent cut ribbons in the final stack of cut sheets so that the position of the adhesive lines between the pairs of ribbons is alternately staggered through the stack.

FIG. 13 illustrates for different thicknesses of honeycomb (the width of the cut ribbons) from ½" to 1½" the number of cuts per minute and the corresponding pounds of honeycomb produced per hour for 80 lbs. per ream paper utilizing the method and apparatus in accordance with the present invention.

By way of example, a honeycomb manufacturing machine in accordance with the present invention can be utilized to produce a honeycomb having a thickness of 1.492" with a cutting assembly operation of 200 cuts per minute and a glueline length and interruption of approximately 1⅜" and ⅛" respectively. This operation corresponds to a feeding speed of a 48" web material at approximately 25' per minute using an 80 lbs. per ream web material.

A honeycomb manufacturing machine in accordance with the present invention and utilizing the drive mechanism illustrated and described with respect to FIG. 11 has operated for the cutting speed of 255 cuts per minute to produce a 1-inch thick honeycomb with a tolerance of ±.004".

While the invention has been described with respect to method and apparatus to produce honeycomb structures in which the axes of the honeycomb cells are aligned substantially normal to the plane of the open honeycomb surface it is possible to produce honeycomb structures in which these axes are not normal to this surface. This can be done by aligning the adhesive manifolds 61 and 61' at an angle to a line running transversely of the web and similarly tilting the shear blade 24, shear bar 23 and the receiving table made up of the support rods 28.

While the adhesive application system has been described as a pressure system, it can, however, be a system operated only through static pressure.

Referring now to FIG. 14, there is shown an alternative adhesive application apparatus for application of interrupted adhesive lines 171 on a web of material 172. The interrupted lines of adhesive 171 are applied to the web material 172 from a roller 173 which is provided with annular grooves so that the lines 171 are spaced apart across the width of the web 172. The grooved roller 173 rotates against the surface of the web of material 172 under a slight pressure applied from a back-up roller 174 so as to wipe the interrupted lines of adhesive from the grooved roller 173 onto the web of material 172. The roller 173 rolls in contact with another grooved pick-up roller 175, a portion of which is immersed in an adhesive reservoir 176. A reciprocating doctor knife schematically shown as 177 reciprocates so as to periodically come in contact with the pick-up roller 175 to interrupt the adhesive picked up on the roller 175 between the grooves in that roller. These interrupted adhesive portions are applied from the pick-up roller 175 to the roller 173 and then onto the web material 172 as described above. By adjusting the cycle of the reciprocating doctor knife 177, the length of the interruptions in the lines 171 can be adjusted. The length of the interruptions in the lines 171 shown in FIG. 14 is selected to be slightly greater than the uninterrupted portions of adhesive for applying an adhesive lined pattern as illustrated in FIG. 15.

Referring now to FIG. 15, there is shown an interrupted adhesive line pattern applied to the face of a web of material 178 which may be passed through the honeycomb fabricating machine described above to produce honeycomb using only one web of material. Two staggered sets of interrupted adhesive lines 179 and 180 are applied to the face of the web material by, for example, two adhesive application assemblies such as the assembly shown in FIG. 14. In each of the sets of interrupted lines 179 and 180, the length of the interruption in the lines is slightly greater than the length of the continuous portion of the line so that between the staggered sets of lines adhesive-free regions 181 extend across the width of the web 178, at which regions the web material can be cut in the cutting assembly D. Since the sets of lines 179 and 180 are staggered across the width of the web as well as longitudinally the length of the web, successive ribbons cut from the end of the web of material in the cutting assembly D will be provided with staggered adhesive lines so that a stack of such ribbons adhered together along the adhesive lines forms a honeycomb structure.

Although the foregoing invention has been described in some detail by way of illustration and example for purposes of clarity of understanding, it is understood that certain changes and modifications may be practiced within the spirit of the invention as limited only by the scope of the appended claims.

It is claimed:

1. A method of making an expandable block of material comprising the steps of: applying to one side of a continuously moving web of material periodically interrupted, spaced apart, parallel lines of adhesive extending longitudinally of said web, the periodic interruptions in said lines of adhesive forming adhesive-free regions extending across said web; periodically stopping movement of only a portion of said web at the forward end thereof; cutting an adhesive lined sheet from the stopped web portion along one of said adhesive-free regions; and thereafter adhering a plurality of said sheets to one another along said parallel lines of adhesive.

2. In the manufacture of honeycomb material, the method which includes the steps of: applying longitudinally extending and periodically interrupted, spaced apart, parallel lines of adhesive to at least one face surface of continuously moving web material; periodically stopping the movement of the forward end portion of the adhesive lined web; cutting the forward end portion of the stopped web along a line substantially transversely of said web and aligned with the interruptions in said adhesive lines; stacking the cut end portions in front face to back face relationship with the lines of adhesive at the obverse face of each cut end portion disposed in staggered, parallel relationship to the lines of adhesive at the reverse face of such end portion; and adhering said cut portions together along said lines of adhesive.

3. A method of making an unexpanded block of honeycomb comprising the steps of: continuously driving a pair of webs; moving said continuously driven webs into contacting relationship with one surface of each web confronting a surface of the other web; applying longitudinally extending, spaced apart, parallel lines of adhesive to one confronting and one non-confronting surface of said pair of webs, the lines of adhesive on the confronting surface disposed in staggered parallel relationship to the lines of adhesive on said non-confronting surface and the periodic interruptions in said lines of adhesive forming adhesive-free regions running substantially transversely of said webs of material; periodically stopping only the forward end potrions of said contacting webs; cutting a pair of contacting sheets from the stopped forward end portions of the webs along a line through said adhesive-free regions; stacking said cut pair of web portions in a stack of similar cut web portions; and compressing and heating said stack of cut web portions to cure the lines of adhesive for adhering adjacent sheets to one another.

4. A method of making honeycomb comprising the steps of: continuously driving a pair of webs; moving said continuously driven webs into contacting relationship with one surface of each web substantially entirely confronting a surface of the other web; applying longitudinally extending, spaced apart, parallel lines of adhesive to one confronting and one non-confronting surface of said pair of webs, the lines of adhesive on the confronting surface disposed in staggered parallel relationship to the lines of adhesive on said non-confronting surface and the periodic interruptions in said lines of adhesive forming adhesive-free regions running substantially transversely of said web material; periodically stopping only the forward end portions of said contacting webs with one of said adhesive-free regions substantially aligned at the shearing line between a shear blade and a shear bar; advancing one end of said shear blade toward said shear bar; then advancing the entire shear blade to shear the web; then retracting said one end of said shear blade; retracting the other end of said shear blade whereby when said shear blade retracts past said shear bar, said shear blade and said shear bar are substantially parallel; holding the sheared forward end portion of the webs to said shear blade until said shear blade is retracted; varying the length of the adhesive lines between interruptions and the length of web material moving past the shear blade between stopping positions to select the desired thickness for the honeycomb; stacking said periodically cut pairs of web portions in a stack with the adhesive lined non-confronting surface of substantially every pair contacting the adhesive-free non-confronting surface of an adjacent pair; compressing and heating said stack of cut web portions to cure the line of adhesive for adhering adjacent sheets to one another; and expanding said stack of web portions to form an expanded honeycomb.

5. In the manufacture of honeycomb material, the method which includes the steps of: applying longitudinally extending spaced apart parallel lines of adhesive to at least one face of continuously moving web material; periodically stopping the movement of the forward end portion of the adhesive lined web; cutting the forward end portion of the stopped web along a line substantially transversely of said web; stacking the cut end portions in front face to back face relationship with the lines of adhesive at the obverse face of each cut end portion disposed in staggered, parallel relationship to the lines of adhesive at the reverse face of such end portion; and adhering said cut portions together along said lines of adhesive; said step of cutting the stopped forward end portion of the web including advancing one end of a shear blade disposed on one side of the stop web toward a bar disposed on the opposite side of said stopped web; advancing the whole shear blade to shear the web; first retracting said one end of said shear blade; and then retracting the other end of said shear blade whereby when said shear blade retracts past the edge of said shear bar said shear blade and said shear bar are substantially parallel for immediate advancement of the web for subsequent shearing.

6. In the manufacture of honeycomb material, the method which includes the steps of: applying longitudinally extending spaced apart parallel lines of adhesive to at least one face of continuously moving web material; periodically stopping the movement of the forward end portion of the adhesive lined web; cutting the forward end portion of the stopped web along a line substantially transversely of said web with a shearing member moving in a direction substantially normal to the movement of the forward end portion of said web; holding the sheared forward end portion of said web to said shearing member; repelling said sheared forward end portion from the shearing member when said shearing member is retracted thereby to stack the cut end portions in front face to back face relationship with the lines of adhesive at the obverse face of each cut end portion disposed in staggered, parallel relationship to the lines of adhesive at the reverse face of such end portion; and adhering said cut portions together along said lines of adhesive.

7. A machine for producing an unexpanded block of honeycomb of selected thickness and length from at least one roll of web material of established width, comprising: a frame for supporting the web roll; means for continuously driving said web material through said frame; means for applying periodically interrupted, spaced apart, parallel lines of adhesive longitudinally on at least one face of said web material, the interruptions of said lines being arranged to define adhesive-free regions extending across said web material; means for periodically stopping only the forward end portion of said web material; means for cutting the stopped forward end portion of said web material along one of said adhesive-free regions; and means for stacking cut web portions.

8. The machine according to claim 7 including: means for changing the length of the adhesive lines between interruptions and means for changing the length of the forward end portion cut from said web material whereby honeycomb structures of different thicknesses may be manufactured.

9. The machine according to claim 7 including means for holding the forward end portion of said stopped web material forward of the adhesive-free region along which said web material is cut while said forward end portion is being cut.

10. The machine according to claim 7 wherein said cutting means includes a shear blade and a shear bar disposed on opposite sides of said web material, said shear blade having a plurality of air passages disposed along the length thereof, and means for drawing air through said passages when said shear blade is actuated to hold cut web portions against said shear blade until said shear blade is retracted.

11. The machine according to claim 7 wherein said means for applying said lines of adhesive on said web material includes a manifold adapted to contain an adhesive under slight pressure, said manifold having a plurality of spaced apart orifices disposed at positions across the width of said web material at which said lines of adhesive are to be applied, means for providing an adhesive material in said manifold with a slight pressure at said orifices and means for periodically relieving the pressure on the adhesive at said orifices for interrupting the flow of adhesive through said orifices to establish the periodic interruptions in said lines of adhesive on said web material.

12. The machine according to claim 7 characterized further in that said means for periodically stopping only the forward end of said web material includes a brake adapted to stop movement of said web material when brought into contact therewith; means for periodically moving said brake into contact with said moving web material; drive means positioned between said brake and said cutting means for driving said web material to a speed faster than the speed of the web material on the other side of said brake whereby slack created in said continuously moving web material during stoppage of the forward end portion of said web material is taken up before the end portion of said web material is again stopped; and means responsive to the position of said brake for actuating said cutting means whereby said cutting means engages the web material only when said web material is stopped.

13. The machine according to claim 7 characterized further in that said means for periodically stopping only the forward end of said web material includes a pair of drive rollers engaging said web material before said web material passes through said cutting means; driving means for driving said pair of rollers to a velocity substantially greater than the velocity of said continuously moving web material through said frame and for a period of time necessary to take up slack in said web material and drive the predetermined length of web material past said cutting means.

14. A machine for producing an unexpanded block of honeycomb core of selected thickness and width from rolls of web material of established width, comprising: a frame for supporting the web rolls; means for moving said webs into substantially parallel confronting relationship; means for applying periodically interrupted, spaced apart, parallel lines of adhesive longitudinally on a confronting face and a non-confronting face of said webs, the interruptions of said lines being arranged to define adhesive-free regions extending substantially transversely across said webs; means for continuously driving said confronting webs through said frame at a substantially constant velocity; means for periodically stopping only forward end portions of said pair of confronting webs; means for cutting the stopped forward end portions of said pair of confronting webs along said adhesive-free regions; and means for stacking the cut pairs of said forward end portions whereby the lines of adhesive on the non-confronting face of substantially every pair contact the adhesive-free non-confronting face of an adjacent pair.

15. A machine for producing honeycomb of selected thickness and width from rolls of web material of established width comprising: a frame for supporting the web rolls; means for moving said webs into substantially parallel confronting relationship; means for applying periodically interrupted, spaced apart, parallel lines of adhesive longitudinally on a confronting face and a non-confronting face of said webs, the interruptions of said lines being arranged to define adhesive-free regions extending substantially transversely across said webs, said adhesive applying means including a manifold constructed and adapted to contain an adhesive material and having a plurality of adhesive applying orifices positioned at spaced apart locations across the width of said webs at which said lines of adhesive are to be applied, means for providing an adhesive material within said manifold and at a slight pressure at said orifices, and means for periodically relieving the pressure on the adhesive at said orifices for interrupting the lines of adhesive applied to said webs; means for continuously driving said confronting webs through said frame and past said adhesive applying means at a substantially constant velocity; means for periodically stopping only forward end portions of said confronting webs including a pair of drive rollers mounted on said frame and engaging said web material, means for uniformly periodically stopping rotation of said drive rollers, and driving means for driving said pair of rollers to a velocity substantially greater than the velocity of said continuously moving web material through said frame for a period of time necessary to take up slack in said web material during stoppage of said drive rollers whereby a predetermined length of web material is driven past said drive rollers in the interval between successive stoppings of the drive rollers; means for cutting the stopped forward end portions of said pair of confronting webs along said adhesive-free regions including a shear blade and a shear bar disposed on opposite sides of said confronting webs and means for independently advancing and retracting opposite ends of said shear blade whereby said webs are progressively cut along the width thereof and the shear blade retracted from its cutting position substantially parallel to said shear bar, said shear blade having a plurality of air passages disposed along the length thereof and means for drawing air through said passages to hold cut web portions against said shear blade until said shear blade is retracted; means for changing the length of said adhesive lines between interruptions and changing the length of the web material driven past said cutting means in the interval between stopping periods whereby honeycomb of different thickness can be made; means for stacking the cut forward end portions of said webs; means for holding said stack of cut web portions under compression whereby adjacent cut web portions are adhered together; and means for applying tension to said stack of adhered web cut portions to expand said stack into a honeycomb member.

16. Apparatus for processing selected portions of a web of material of established width comprising: a frame; means mounted on said frame for continuously driving said web material through said frame; a pair of drive rollers mounted on said frame and engaging said web material; means for uniformly periodically stopping rotation of said drive rollers, and driving means for driving said pair of rollers to a velocity substantially greater than the velocity of said continuously moving web material through said frame for a period of time necessary to take up slack in said web material during stoppage of said drive rollers whereby a predetermined length of web material is driven past said drive rollers in the interval between successive stoppings of the drive rollers.

References Cited

UNITED STATES PATENTS

| 3,257,253 | 6/1966 | Hoyt | 156—256 |
| 2,610,934 | 9/1952 | Steele | 156—197 |
| 3,035,952 | 5/1962 | Gwynne | 156—512 |
| 3,049,461 | 8/1962 | Beahm et al. | 156—197 |
| 3,138,514 | 6/1964 | Florio | 161—129 |

EARL M. BERGERT, *Primary Examiner.*

H. F. EPSTEIN, *Assistant Examiner.*

U.S. Cl. X.R.

156—512, 548